United States Patent [19]
Fujimoto

[11] Patent Number: 5,283,643
[45] Date of Patent: Feb. 1, 1994

[54] FLIGHT INFORMATION RECORDING METHOD AND DEVICE FOR AIRCRAFT

[76] Inventor: Yoshizo Fujimoto, 4-10, Nakamachi, 3-chome, Kiryu-shi, Gunma-ken 376, Japan

[21] Appl. No.: 862,571
[22] PCT Filed: Oct. 29, 1991
[86] PCT No.: PCT/JP91/01471
§ 371 Date: Jun. 23, 1992
§ 102(e) Date: Jun. 23, 1992
[87] PCT Pub. No.: WO92/07757
PCT Pub. Date: May 14, 1992

[30] Foreign Application Priority Data
Oct. 30, 1990 [JP] Japan .................. 2-292827

[51] Int. Cl.⁵ .................. B64D 47/08; H04N 7/18
[52] U.S. Cl. .................. 348/143; 340/973; 358/335; 358/117; 381/183
[58] Field of Search ........... 358/103, 108, 901, 335; 340/973; 381/183; H04N 7/18

[56] References Cited
U.S. PATENT DOCUMENTS
3,278,680 10/1966 Hummel .................. 358/103
4,568,972 2/1986 Arents .................. 358/108

FOREIGN PATENT DOCUMENTS
56-69600 6/1981 Japan .
62-47500 3/1987 Japan .

Primary Examiner—Howard W. Britton
Attorney, Agent, or Firm—Ladas & Parry

[57] ABSTRACT

Displacements of connecting rods (55) between control devices and control surfaces (10) manipulated by a pilot (8), a pulse data based on the normal pulse of the pilot (8), and time data of the related information are indicated on a central display unit (30) arranged on an instrument panel (9) together with various gauges; a view of instrument panel (9) including a displayed data on the central display unit (30) is captured by a first television camera (20) disposed in a cockpit (6) as a first piece of image information; the actual state of a main wing (2) and that of tail stabilizer (3) reflected on mirrors (22,23) installed on the middle part of the upper fuselage are captured by a second television camera (21) installed on a vertical stabilizer (4) facing the nose of the fuselage as a second piece of image information; and both pieces of image information from respective camera are synchronized and combined as complex image information and recorded on magnetic tape through a video recorder (24).

11 Claims, 10 Drawing Sheets

FLIGHT INFORMATION RECORDING METHOD AND DEVICE FOR AIRCRAFT

FIELD OF THE INVENTION

This invention relates to a flight safety device for small to medium aircraft, and more particularly, to a simplified flight information recording method and device which can take the place of a flight recorder and a voice recorder used in larger aircraft.

PRIOR ART

Large commercial aircraft are required to carry a flight data recorder that records and stores digitalized flight information for the preceding 24 hours in a memory device and maintains such memory as an operational record. In addition, a voice recorder is also carried on board large aircraft to store voice/sound recordings for the preceding 30 minutes. On the other hand, since aircraft devices, most small to medium aircraft are not equipped with these recording devices.

Japanese Patent Appln. No. 62-113700 and Japanese Utility Model Appln. No. 63-110200 disclosed technical methods for a pilot to verify exterior appearance of the fuselage during flight.

The conventional digital flight recorder and voice recorder installed in large aircraft are rigidly built, bulky and heavy because these recorders must possess high reliability, resistance against vibration, pressure, and heat. Therefore, these recorders are not suitable for medium to small aircraft because of their shape, mass and weight. In addition, the conventional flight control system displacement detectors and their installation are not only too complicated to be applied to small sized aircraft, but they are difficult to install. Furthermore, since the installation of such equipment on small aircraft is not required by applicable Aviation Regulations, flight information recording devices for small aircraft have never been developed.

In the prior art, a device that enables a pilot to detect any damage an aircraft may sustain during flight can be accomplished from the cockpit through peep holes provided on the top and bottom surface of the fuselage by using a combination of optical fiber, rotating mirrors, and zoom lenses. Another device is a retractable rear view mirror for emergency use. This mirror can be pushed out of the side of the fuselage in front of the pilot in order to assess damage that may have occurred. However, since the purpose of both of these devices is not to record the state of damage or the effects and changes occurring during flight conditions but rather, to verify the exterior appearance of the fuselage during flight, it is difficult to evaluate when there is an accident as to whether or not the pilot has properly reacted and coped with an emergency situation during flight. In addition, information regarding proper inspection and repairs is particularly important and must be completed before and after each flight.

Once an accident occurs, regardless of the size of the aircraft, a disaster will result which will most likely involve not only the crew but also occupants at the crash site. Effective prevention measures must be taken to eliminate aircraft accidents, and of equal importance is an accident investigation. Oftentimes, the accident investigation for small aircraft is only based on the information obtained from the wreckage of the aircraft and/or instruments recovered from the crash site. For large aircraft, the recording devices such as the digital flight data and voice recorders recovered can be decoded and analyzed after an accident, in order to help determine the cause of the accident. It is extremely difficult to determine the causes of small aircraft accidents if a deficiency of the aircraft, a sudden change of the pilot's physical condition or an error in the pilot's judgement is the cause of the accident. Without any objective flight information record, possible causes of accidents may not be properly ascertained. Under these circumstances, accidents involving small aircraft keep occurring every year without an effective measures to prevent their reoccurrence. There has been a long felt need to develop a compact and reasonably priced flight recorder for small aircraft capable of improving safety by recording flight conditions as well as other pertinent information.

SUMMARY OF THE INVENTION

It is therefore an object of the invention to provide a method and a device adaptable to a small or medium sized aircraft for recording flight information. Accordingly, the present invention includes a central display unit installed on an instrument panel together with various gauges which shows overall information of the pilot's control action. The displacement of control rods and the similar connecting control devices for the aircraft's control surfaces, pulse data based on normal heartbeat of the pilot, and the time of occurrence of an event are all shown on the central displaying unit. A view of the instrument panel including the central display unit is captured by a first television camera which provides a first piece of image information. Meanwhile a view showing actual movement of the main wings and images showing actual state of tail surfaces are reflected on mirrors installed in the middle of the fuselage and are captured by a second television camera mounted on the vertical stabilizer facing the nose of the fuselage. This camera provides a second piece of image information. These two pieces of images information are synchronized and combined as complex image information and recorded on magnetic tape through a recording device.

The central display unit comprises a luminescent display arrays for indicating the displacement of each connecting rod that connects the control device to the control surface, from a neutral point. A luminescent display array indicates pulse data with reference to the pilot's normal pulse rate, and an array of luminescent display digital information exhibiting data concerning time elapsed in calendar year, month, day, time, and flight duration and is capable of relating back to the time of a particular occurrence.

A displacement detector installed along the connecting rod is used to detect the above-mentioned displacement. The displacement detected is in the form of a 3-bit code which is converted from an on-off light signal passing through holes of a perforated plate.

A photoelectric sensor is mounted on the grip of a control stick, or a control wheel so it is in close contact with the inner side of the pilot's finger in order to detect epidermic blood pulse as indicated by an on-off light signal. This signal is entered into a counter and subsequently converted into pulses per minute. The pilot's pulse per minute and its changes can be visualized on the luminescent display array.

A microprocessor reads the pre-programmed time of the day, the month, the year, and flight duration periodically from a built-in timer generator in the central display unit and outputs this information on to the luminescent display array.

The central display unit is powered by a built-in battery. The flight duration is measured between the start up and shut off of the engine. It is turned ON and OFF by a relay switch interlocked with the aircraft's master switch.

The present invention seeks not only to display various flight information that may change continuously on the various gauges, but to record them by means of a video recorder. The major function of the video recorder is to record and store complex image information. This complex image information comprises the instrument panel image captured by a first television camera and the image captured by a second television camera which is mounted on the vertical stabilizer. The image information of the instrument panel captured by a first television camera contains data from the central display unit. The major function of the central display unit is to demonstrate the pilot's control action on the luminescent display arrays in terms of displacements of the control surfaces. The demonstration of the displacement is achieved by the displacement detectors installed on the control systems. A special characteristic of this invention features the display and recording of the pilot's heart pulse data which represents the pilot's physical condition. This pulse data may be used as a reference to determine the pilot's mental condition as to whether he/she is calm or under tension. The pulse data is preferably obtained from the epidermic blood pulse of the pilot's finger and is transmitted as an on-off signal via the pulse detector provided on the control stick or control wheel and converted into pulse per minute by a counter circuit and is indicated on the luminescent display array. The pulse data may sometimes be lost depending on the way the pilot grips the control wheel. Consequently, a pulse detector may be installed on the radio receiver headphone which is worn by the pilot at all times. A pulse detector is then attached to the pilot's ear via an earlobe clip or electrocardiographic sensor, made of metal and installed in the earphone pad. This is pressed against the pilot's ear. Either an on-off light signal or an electric potential detected by either one of the above detectors is converted into a pulse count per minute and outputted to the luminescent display array. Accordingly, the central display unit shows the pilot's pulse and its changes during flight. The data are not only for monitoring, but can be stored as a video recording together with indications of the instruments on the instrument panel.

A second piece of image information captured by the second television camera includes actual displacement of the right/left ailerons, flaps, and spoilers if equipped on the main wings and attitude or banking angle of the main wing in relation to the horizon or the ground surface during the period between take-off and landing, and an image of the fuselage as seen from the aft, as well as images of actual displacement of the rudder and right/left elevators which is reflected either on the mirror mounted on the rear fuselage or on another mirror installed near the rear window of the cockpit. This method of maintaining information makes it possible to record flight information continuously while the conventional means such as a retractable mirror only verify image information.

A video signal compositioner puts the first and second image information together vertically by setting scan areas and synchronizing them so that the images can be combined into one complex image information. This information is recorded on magnetic tape. As a result, the flight condition of an aircraft and other data can be recorded and stored as visual flight information.

In addition, the above-described complex image information recording method of this invention enables recording of ambient voices and sounds such as conversation. ATC (Air-Traffic Control) communication, engine sound and wind noise are picked up by a built-in microphone in the first television camera. The recorder can also be used as a recording device consistent with conventional voice recorder.

DETAILED DESCRIPTION OF THE PREFERRED EMBODIMENTS

Flight information recording device for aircraft is now described in conjunction with the preferred embodiments and the accompanying drawings.

Figure 1:
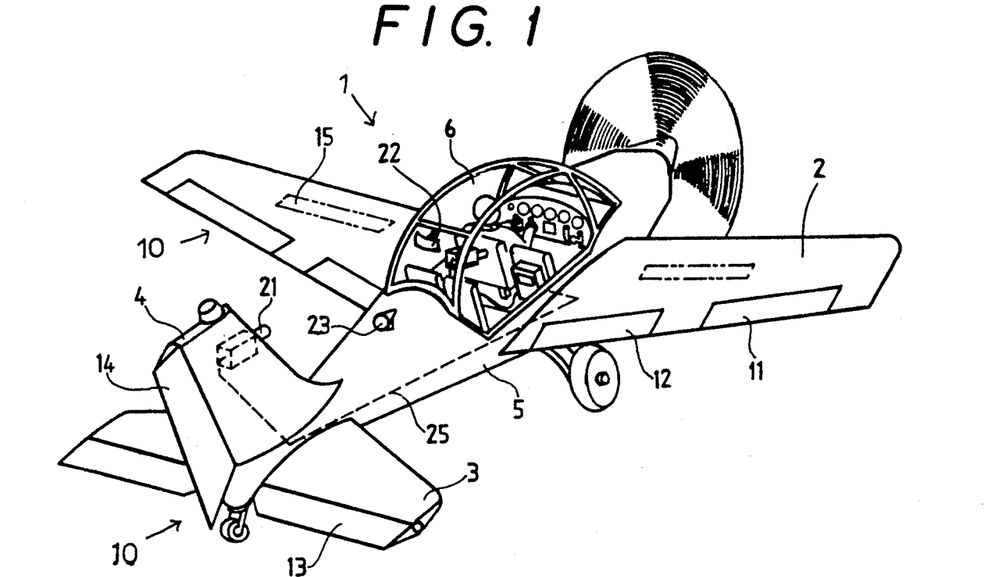
FIG. 1 is an overall perspective view of a small airplane.

FIG. 1 is an overall perspective view of a small airplane showing general configuration. The airplane is comprised of a main body 5 having main wings 2, horizontal stabilizer 3 and vertical stabilizer 4, cockpit 6 provided forward of the main body 5, and several control surfaces 10 such as right/left ailerons right/left flaps 12 right/left elevators 13 of horizontal stabilizer 3, rudder 14 of vertical tail 4, and right/left spoilers 15. The relation between an engine and a propeller is omitted.

Figure 2:
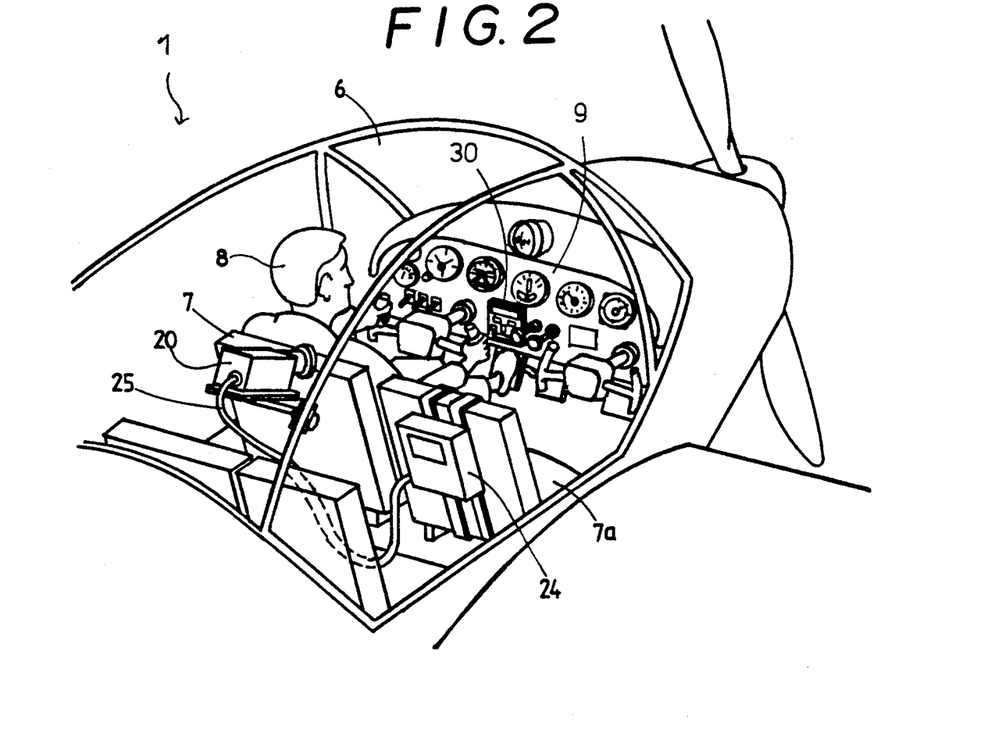
FIG. 2 is a perspective view of a cockpit.

FIG. 2 is a perspective view of a cockpit 6 of the airplane 1 and a pilot 8. As is known, an instrument panel 9 is installed in front of the cockpit 6 and several indicators and gauges are provided in the instrument panel 9. A first television camera 20, a major component of this invention, having a built-in microphone (not shown) is mounted on a support in the cockpit with appropriate fittings. The first television camera 20 is positioned between the pilot's and the co-pilot's seats facing the instrument panel 9. A central display unit 30 is located in the center of the instrument panel 9 where the major group of instruments are arranged. The first television camera 20 is aimed at this part so that it can monitor and capture an image of the area. A second television camera 21 is mounted on the upper leading edge of the vertical stabilizer 4 (FIG. 1). The second television camera 21 is installed parallel to the longitudinal axis of the aircraft 1 facing the nose of the fuselage and fixed so that the upper surfaces of the right and left main wings are seen parallel to or intersect with the horizon at the same angle. Both the mirror 22, installed in the cockpit near the rear window, and mirror 23, mounted on top of the mid fuselage, face the rear of the aircraft. The images of these mirrors are within the visible range of the second television camera by the rules of projection and reflection.

Reference numeral 24 denotes a magnetic tape recorder connected to the first and second television cameras. This recorder is contained within a heat resistant bag covered with a vibration absorbing material and is saddled and fastened with a belt to the back of the co-pilot's seat. Vibration absorbing material is either foam resin or rubber plate used to cover the bag. In the embodiment, the vibration absorbing material is made up of a foam styrene block having an indentation to encase the bag and is divided into two parts defining a box and a lid. The heat-resistant bag is made from glass fiber cloth sewn to the size of the magnetic tape recorder 24. A part of it is cut out to facilitate replacement of cassette tape without removing the recorder from the bag. It is preferred to cover the absorbing material with an aluminum box (not shown) in order to more effectively enhance the recorder's resistance to heat and impact. The magnetic tape recorder 24 and the first and the second television cameras are connected by a video signal transmission cable 25.

Figure 3:
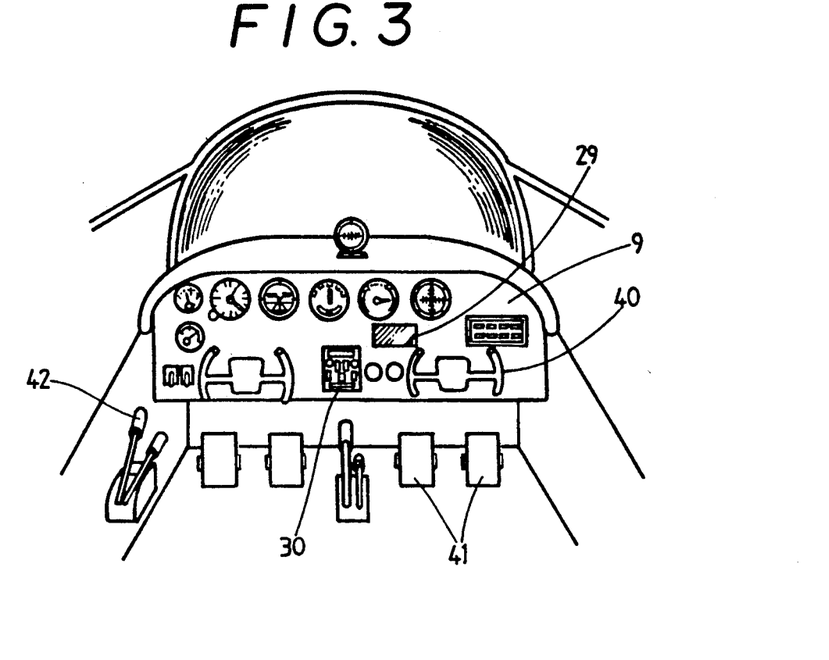
FIG. 3 is a front view of the interior of a cockpit.

FIG. 3 is a front view of the interior of a cockpit 6 looking from aft forward, in which the central display unit 30 is located in the center of the instrument panel 9. A control wheel 40, rudder pedals 41, a flap lever 42, and a mirror 29 reflecting upper body of a pilot are all shown.

Figure 4:
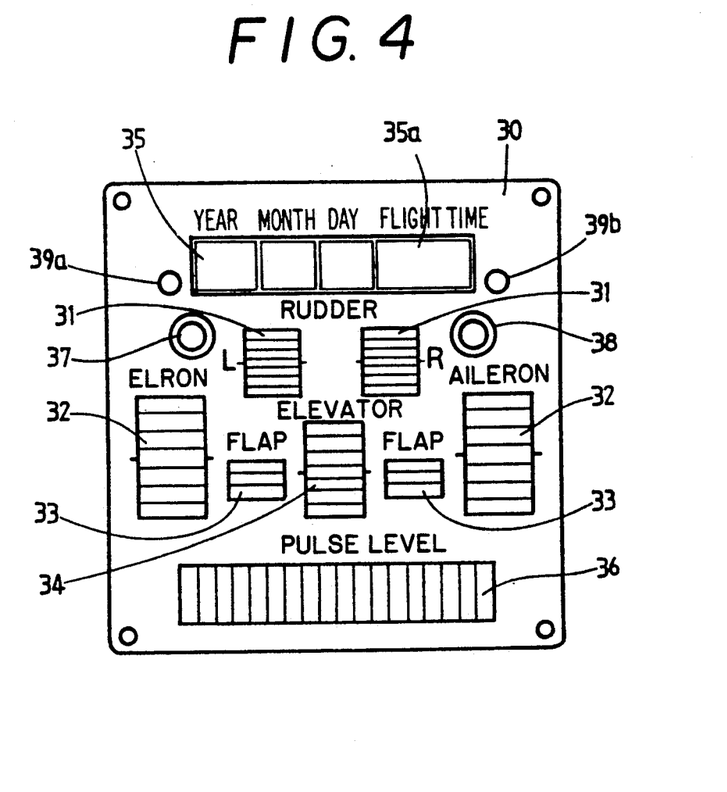
FIG. 4 is a front view of a central display unit.

FIG. 4 depicts the central display unit 30 located on the instrument panel 9 showing an arrangement of an array of luminescent displays 31 to 34 which mainly indicating displacement of control systems. The central display unit 30 is captured by the first televisions camera 20.

The reference numeral 31 denotes an luminescent display which depicts the displacement of the right/left rudder pedals 41 by emitting light from one of the three positions above or three positions below its center which corresponds the neutral position of the rudder.

The reference numeral 32 denotes an luminescent display which depicts the displacement of the right/left ailerons 11. It too has three positions each above and below a neutral point.

Reference numeral 33 denotes a luminescent display which depicts the displacement the right/left flaps 12. It has three different positions. When the flaps are retracted, no indicator is illuminated. The flap positions are indicated by the display in one of the three positions ranging from a minimum to a maximum angle while the flaps are down.

Reference numeral 34 denotes a luminescence display which depicts the displacement of the elevators 10. The display has a neutral position and three positions above and three positions below the neutral position wherein light in the center window is turned on when the elevator is in the neutral position.

Reference numeral 35 denotes a digital display array indicating the calendar year, month, day, time and the flight duration. A preprogrammed timer generator and a calendar circuit (refer to the description below) provide the year, month, and date of the flight continuously while the time of occurrence of an event or flight duration is indicated intermittently on the same luminescent display array 35a.

Reference numeral 36 denotes a luminescent display array for the pulse of the pilot 8 covering from the normal range to foreseeable maximum pulses of the pilot 8. An adjustment dial 37 is used to set the normal pulse of the pilot at a pulse rate somewhere between the end and approximately one-third of the full length of the display, thus, the full range of the display is capable of accommodating the maximum pulse exerted by the pilot.

Reference numeral 38 denotes a brightness adjustment dial for each luminescent display array. The reference numeral 39a denotes a setting dial for the year, month, day and the reference numeral 39b denotes a reset button for the flight duration.

Figure 5:
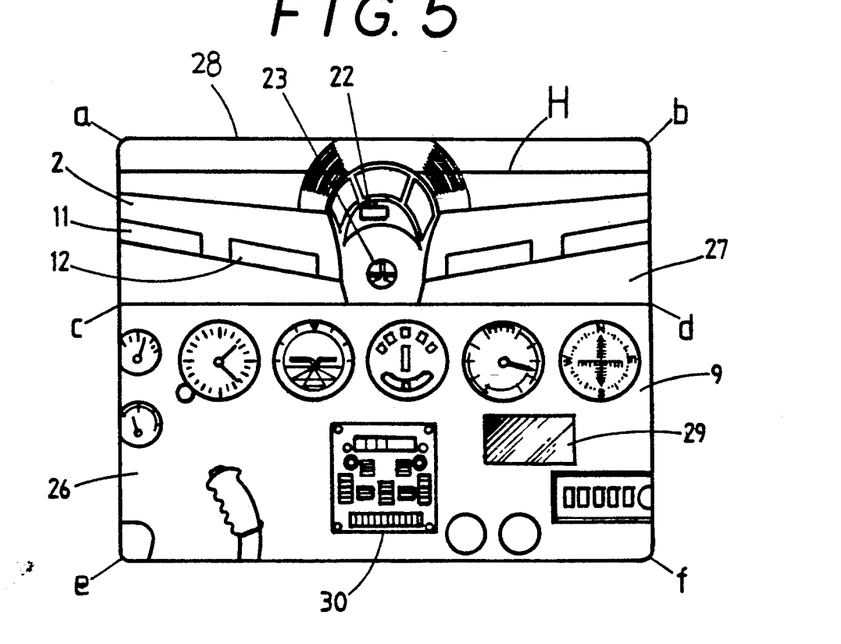
FIG. 5 shows complex image information.

FIG. 5 shows a visualized image area a-b-f-e of the complex image information 28. This is a combination of two pieces of image information 26 and 27 captured by the first and the second television cameras 20 and 21 respectively. It is equivalent to the image obtained by replaying a video recording of the complex image information. In FIG. 5, the image area a-b-d-c of the image information 27 obtained from the second television camera 21 which is installed on the rear of the aircraft and is placed above an intermediate line c-d. The image area c-d-f-e of the image information 26 obtained from the first television camera 20 including many instruments on the instrument panel 9 as well as the central display unit is placed below the intermediate line c-d. These images are synchronized and combined for recording.

Figure 6:
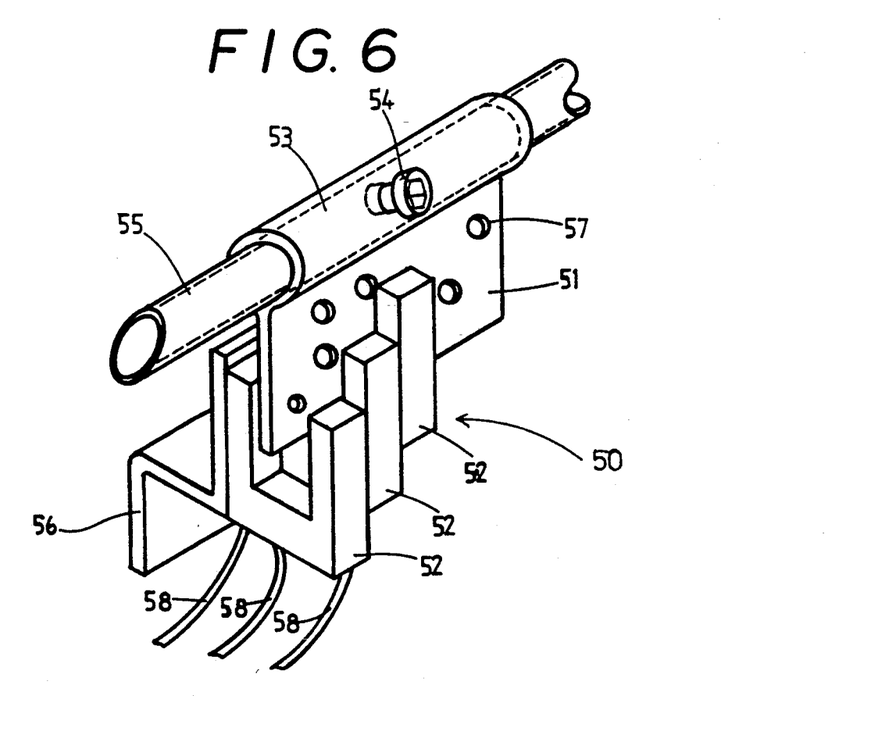
FIG. 6 is a perspective view of the control system displacement detector.
Figure 7:
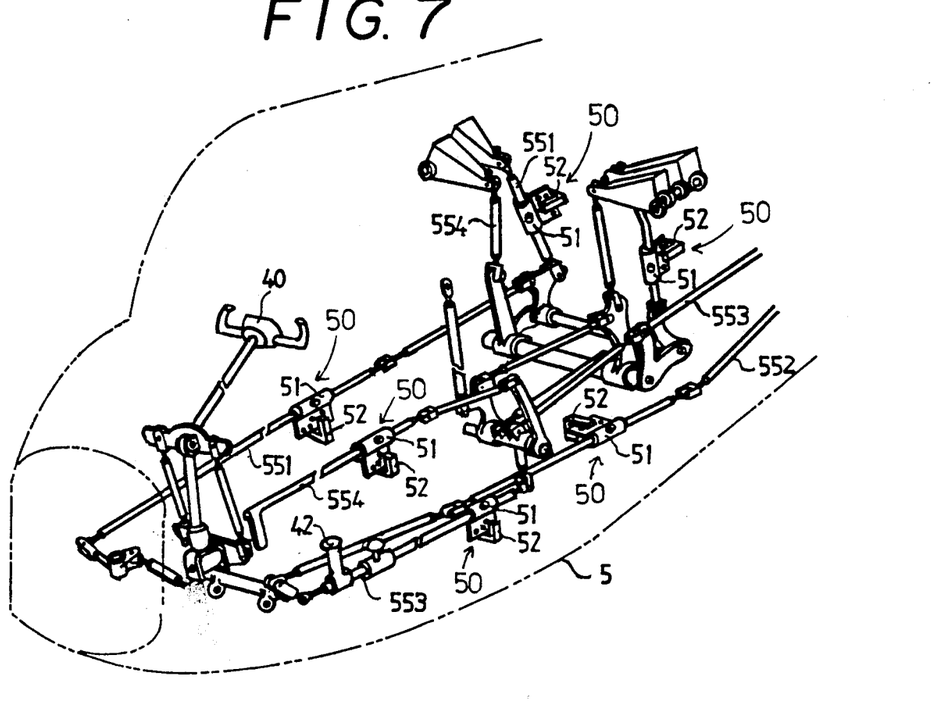
FIG. 7 is a perspective view of control system linkages in the fuselage.

Devices for detecting displacement of the control systems controlled by the pilot is now described with reference to FIG. 6 through FIG. 13. FIG. 6 and FIG. 7 show the displacement detector 50 installed on a connecting rod capable of transferring the various movement of the control devices 40 to each control surface 10. This detector comprises a perforated plate 51 with light bit holes and photoelectric detectors 52, both of which are relatively movable. The perforated plate 51 with light bit holes is attached to the connecting rod 55 of a linkage via a cylindrical holder 53 at the end of the perforated plate through a bolt 54. The photoelectric detector 52 is supported by an airframe structure and includes a detector array with transmission type phototransistors 52a, b, c. (FIG. 12). These phototransistors are installed in three columns which are placed side by side providing a detection slot. The perforated plate 51 slides in and out of the detection slot without making contact. It moves back and forth in the axial direction of the connecting rod 55. Due to the back and forth control movement of the perforated plate 51, the displacement of the connecting rod 55 is detected as on-off light signals generated in a detection array by passage or interruption of the light through the three rows of holes drilled on the perforated plate at a prescribed spacing. The reference numeral 58 denotes lead wires for power supply and output signal which are wired through the interior of the fuselage (not shown) and are connected to the central display unit 30 in the cockpit 6.

Figure 8:
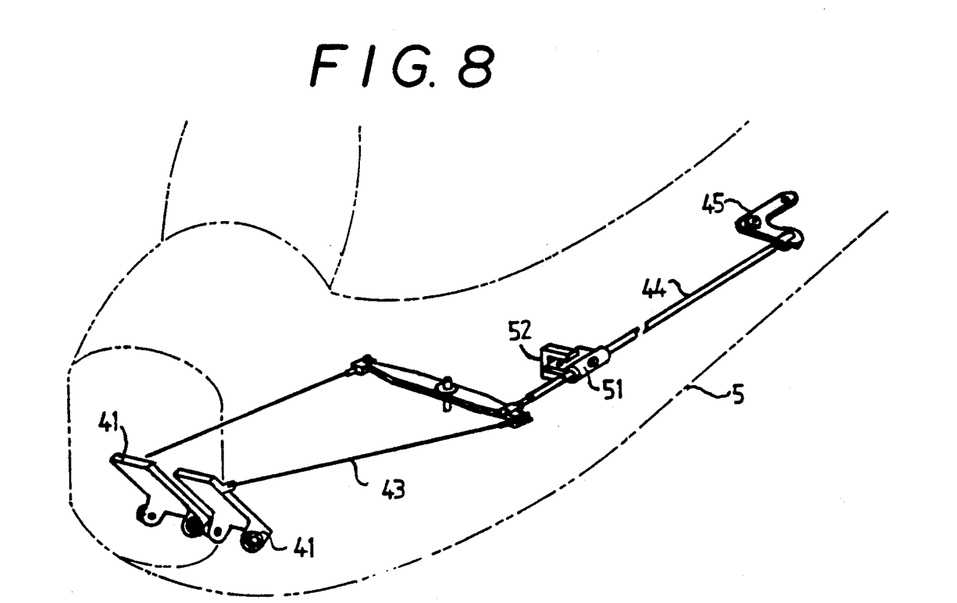
FIG. 8 is a perspective view of rudder pedal linkages

FIG. 7 to FIG. 8 are perspective views showing the linkage connections between each control device 40 provided inside the fuselage, control surfaces 10, and configuration of displacement detector sets 50. The displacement detectors 50 are provided on the connecting rod 551 between the control wheel 40 and the ailerons 11, the connecting rod 552 between the control wheel 40 and the elevators 13, the connecting rod 553 between the flap lever 42 and the right/left flaps 12, and the connecting rod 554 between the spoiler lever 15 and the right/left spoiler 15, respectively.

FIG. 8 shows a perspective view of the installation example of the displacement detectors 50 mounted on the connecting rod 44 of a bell crank 45, which moves the rudder through the connecting rod 44 and connecting cable 43 which is fastened on the rudder pedal 41.

Although not shown, a X-Y sliding resister may be installed immediately below the control yoke 46 or control stick 40a (shown in FIG. 14 and FIG. 16 respectively) in order to detect the displacement of elevator 13 which is controlled by back and forth movement of the control wheel 40 or control stick 40a. The displacement of the aileron 11 is controlled by right and left movement of the control wheel 40 or control stick 40a and is indicated by measuring a variable resistance of X and Y axis respectively for indicating the displacement.

Figure 9:
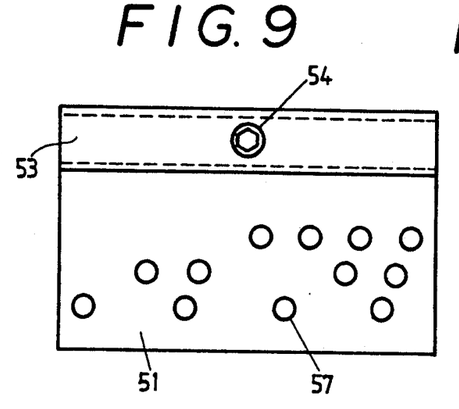
FIG. 9 is a front view of the perforated plate for the photoelectric sensor to detect displacement.

FIG. 9 is a front view of a perforated aluminum plate 51 which is 1 to 2 mm in thickness and has spaced holes 57 3 to 5 mm in diameter drilled and arranged in three rows. The plate helps to generate a three bit code and thus seven possible steps are transmitted by the phototransistors 52 a,b,c.

Figure 10:
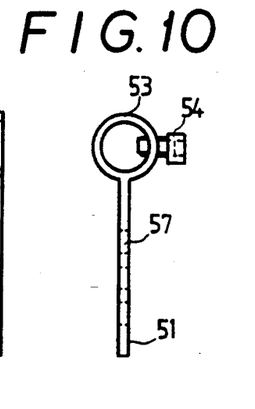
FIG. 10 is a side view of the perforated plate for the photoelectric sensor to detect displacement.
Figure 11:
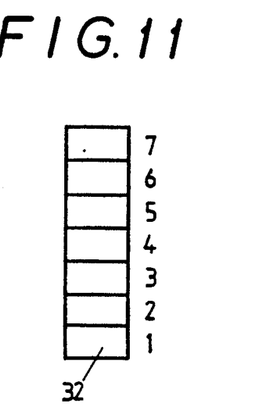
FIG. 11 is a front view of the luminescent display array.
Figure 12:
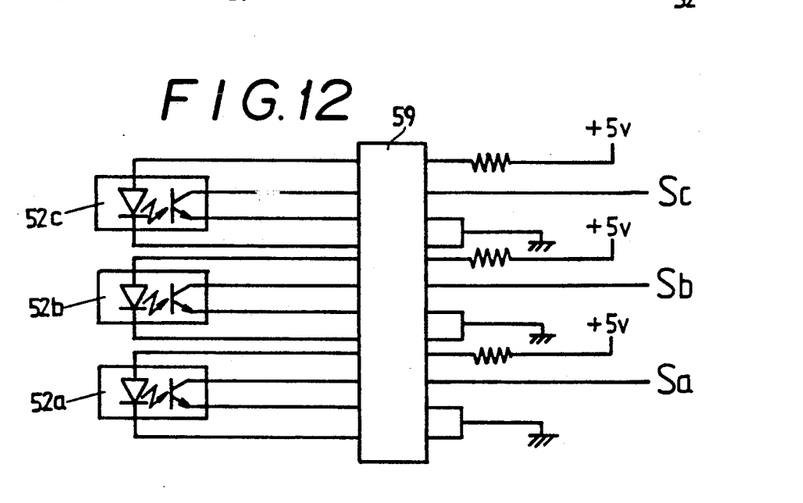
FIG. 12 shows a detection circuit diagram.

FIG. 10 is a side view of the perforated plate 51 and FIG. 11 is a front view of the luminescent array 32 arranged in a series of seven steps.

FIG. 12 is a schematic view of a detection circuit formed of transmission type phototransistors 52a,b,c to detect light passing through the holes 57 of the perforated plate 51. The DC voltage is outputted to an outputs Sc, Sb and Sa when corresponding holes 57 are in alignment with light sources. Reference numeral 59 denotes the detector interface.

Figure 13:
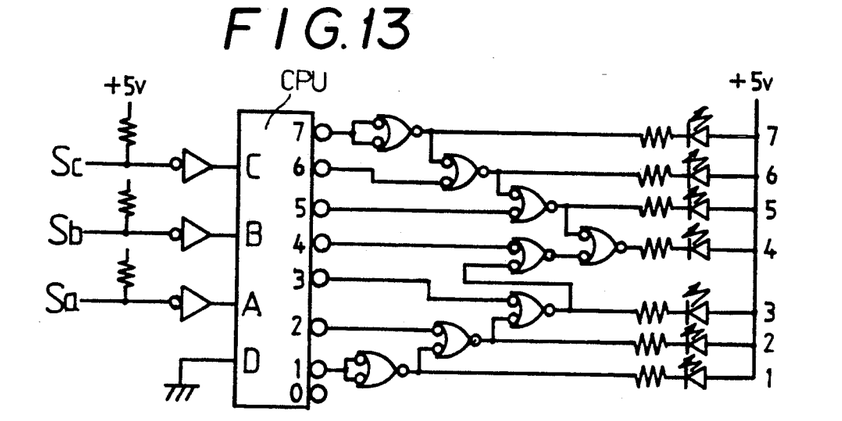
FIG. 13 shows a logic circuit diagram for the display array.

FIG. 13 is a schematic view of a logic circuit diagram. The three bit signals from Sa, Sb and Sc are inputted into the CPU and correspond to one of seven possible positions. There are three display positions above, and three display positions below the neutral point, which is in the fourth position. The numbers shown in FIGS. 11 and 13 define and correspond to the positions in luminescent display array. DC voltage outputted from a certain number of the logic circuits turns on the corresponding position of the luminescent display.

FIG. 14 to FIG. 17 are perspective views of the detection means for the pilot's heart rate pulse data.

Figure 14:
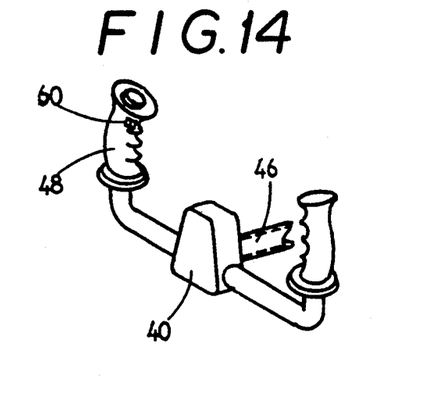
FIG. 14 is a perspective view of the control wheel.

FIG. 14 shows a transmission type phototransistor which serves as a pulse detector 60 and is installed on the plastic grip 48 of the control wheel 40. In order to detect an epidermic pulse rate in the pilot's finger holding the control wheel 40, a detector is installed which will make contact with the first or second joint of the pilot's left finger. It might also be installed on the right side of the grip as long as it is able to make close contact with the surface of the finger or any joint of any finger.

Figure 15:
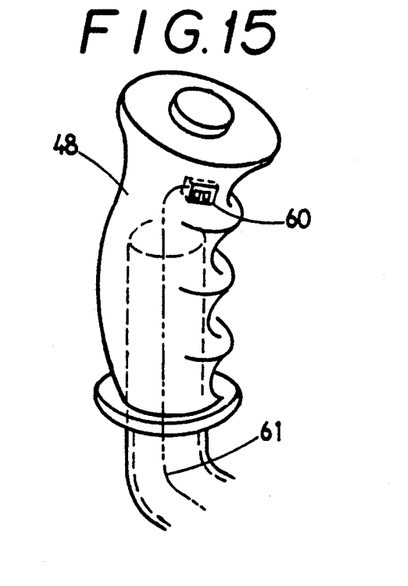
FIG. 15 is an enlarged perspective view of the control wheel grip.

FIG. 15 is an enlarged perspective view of the grip showing a pulse detector 60 imbedded therein. In order to make close contact with the finger, it may be installed on the surface of the grip. The reference numeral 61 denotes a lead wire from the sensor 60 which is wired through a control wheel shaft 46 and connected to the central display unit 30.

Figure 16:
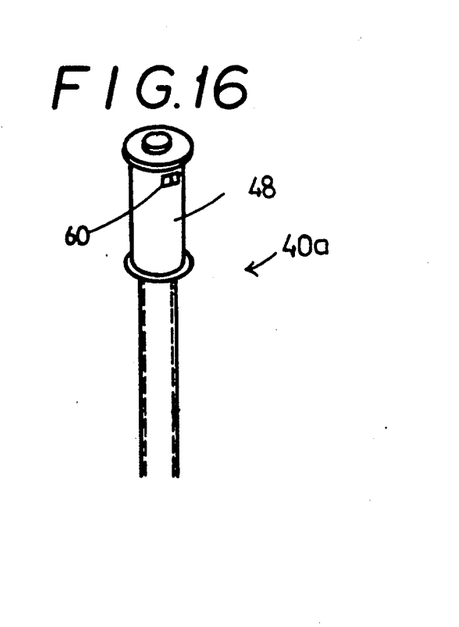
FIG. 16 is a perspective view of the control stick.
Figure 17:
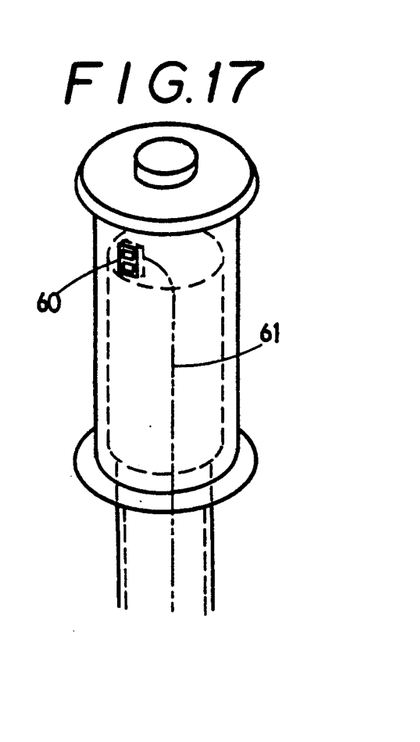
FIG. 17 is an enlarged perspective view of the control stick grip.

FIG. 16 to FIG. 17 are embodiments of control stick 40a comprised of a bar-shaped metal pipe. The pulse detector 60 is installed on the upper part of the grip 48, where it can make close contact with the pilot's forefinger. The explanation of the control wheel embodiment is otherwise applicable here.

FIG. 18 to FIG. 25 show the pulse detector 71 or electrocardiographic sensor 72 installed or built-in on a radio receiver headphone 70. These detectors 71,72 are shown as installation examples in which the function is assured, regardless of an action of the pilot 8.

Figure 18:
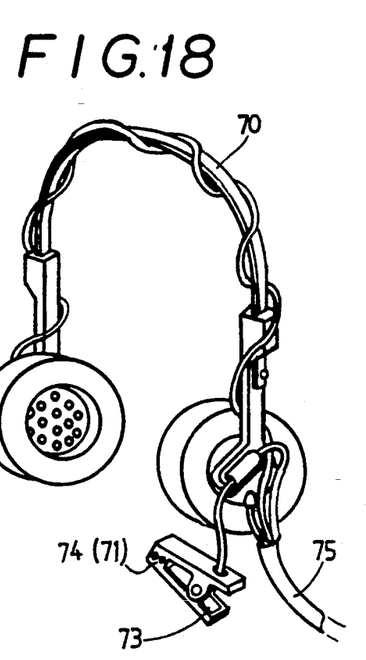
FIG. 18 shows a radio receiver headphone with an earlobe clip.

FIG. 18 shows a radio receiver headphone 70 having an earlobe clip 73 which is attached to a pilot's ear 8a. In this embodiment, a transmission type phototransistor is installed inside the clip 73 to provide the pulse detector 71. When headphone 70 is worn over the head of the pilot 8, an earlobe clip 73 is clipped on the pilot's ear so that the pulse detector 71 is pressed against the pilot's earlobe. The epidermic blood pulse is detected as an on-off light signal and is converted into pulse per minute data by a counter in the central display unit 30 before displaying the final result.

Figure 19:
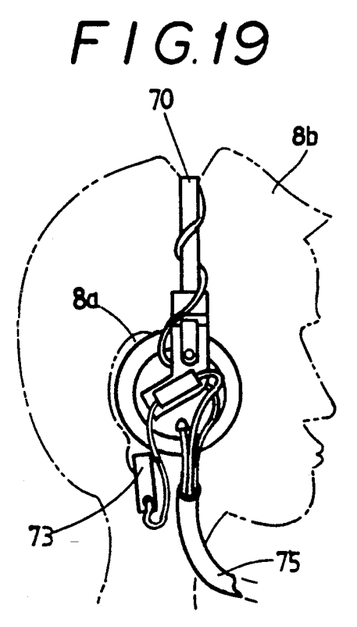
FIG. 19 is a side view of the headset of FIG. 18 worn over the ear.

FIG. 19 shows headphone 70 and the clip 73 as they are worn.

Figure 20:
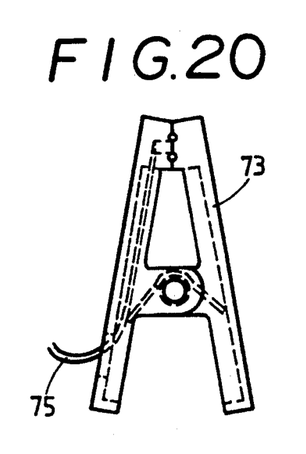
FIG. 20 is a front view of an earlobe clip.

FIG. 20 is a front view of the earlobe clip 73.

Figure 21:
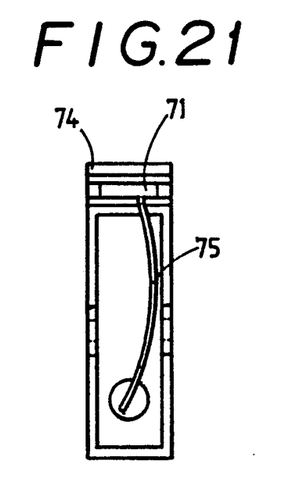
FIG. 21 is a side view of an earlobe clip with a sensor mounted inside.

FIG. 21 is a inner side view of the earlobe clip 73 showing pulse detector 71 imbedded in the tip of the clip 74 so that it makes close contact with the pilot's earlobe.

Figure 22:
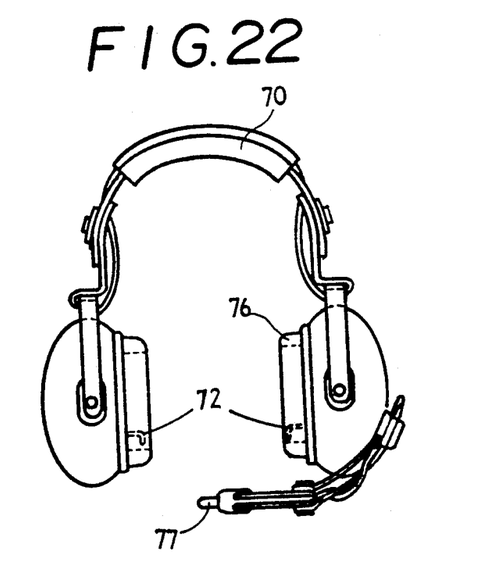
FIG. 22 shows a radio receiver headphone with electrocardiographic sensor.

FIG. 22 is a front view of headphone 70 which is a type that covers ears completely. In the drawing, an electrocardiographic sensor 72, made of metal, is installed inside the ear pad 76. The reference numeral 77 denotes a microphone.

Figure 23:
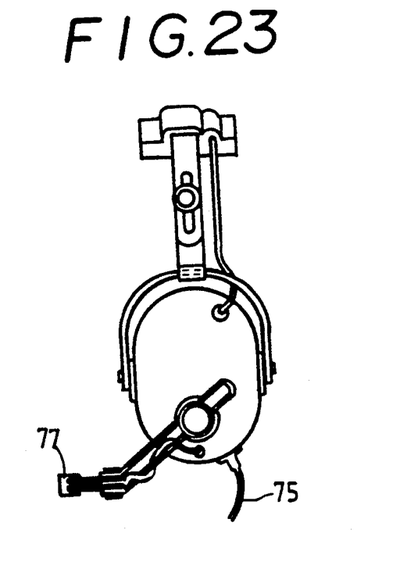
FIG. 23 is a side view of radio receiver headphone with electrocardiographic sensor.
Figure 24:
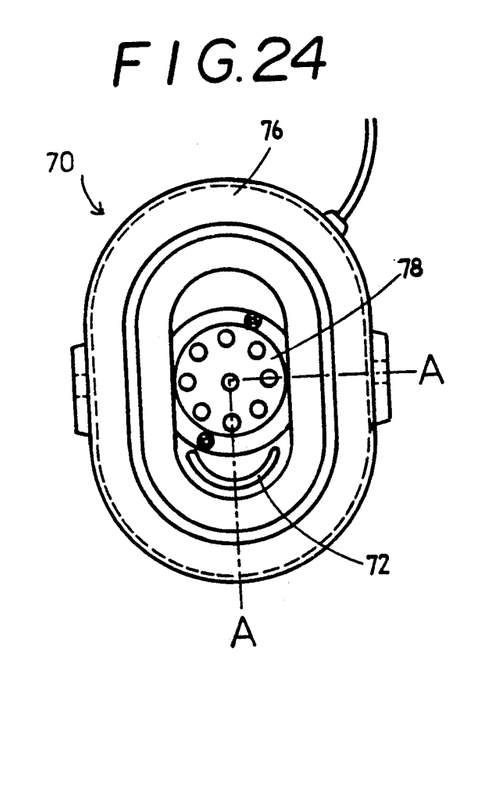
FIG. 24 shows inside of an ear pad.

FIG. 23 is a side view of FIG. 22 and FIG. 24 is an inside view of the headphone showing the shape of the electrocardiographic sensor 72, installed adjacent to a speaker 78. In the present embodiment, the electrocardiographic sensor is formed by curving a brass bar measuring 2 mm in diameter.

Figure 25:
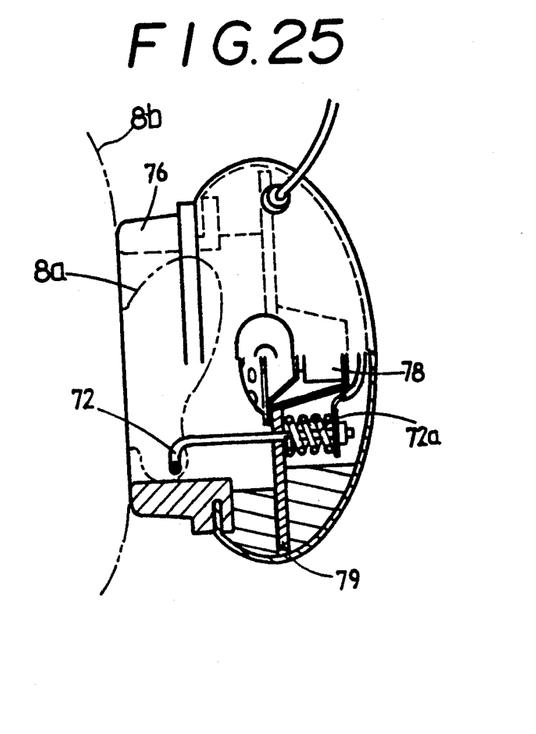
FIG. 25 is a partial sectional view of along lines A—A of FIG. 24.

FIG. 25 is a sectional view taken along line A—A of FIG. 24. A speaker 78 is mounted on a base plate 79. An electrocardiographic sensor 72 is bent to form a curve-like or a U-shape configuration in order to make contact with the pilot's ear 8a, and is installed through holes on the base plate 79. A coil spring 72a is installed behind the base plate 79 in order to provide resistance against pressure.

As mentioned above, of the pilot's mental or physical condition is recorded in the form of by the pulse data. However, a record of the actual state of the pilot 8 is preferred. The actual state of the pilot 8 is captured by the first television camera 20 using a mirror 29 provided on the instrument panel 9 together with the pulse data.

Figure 26:
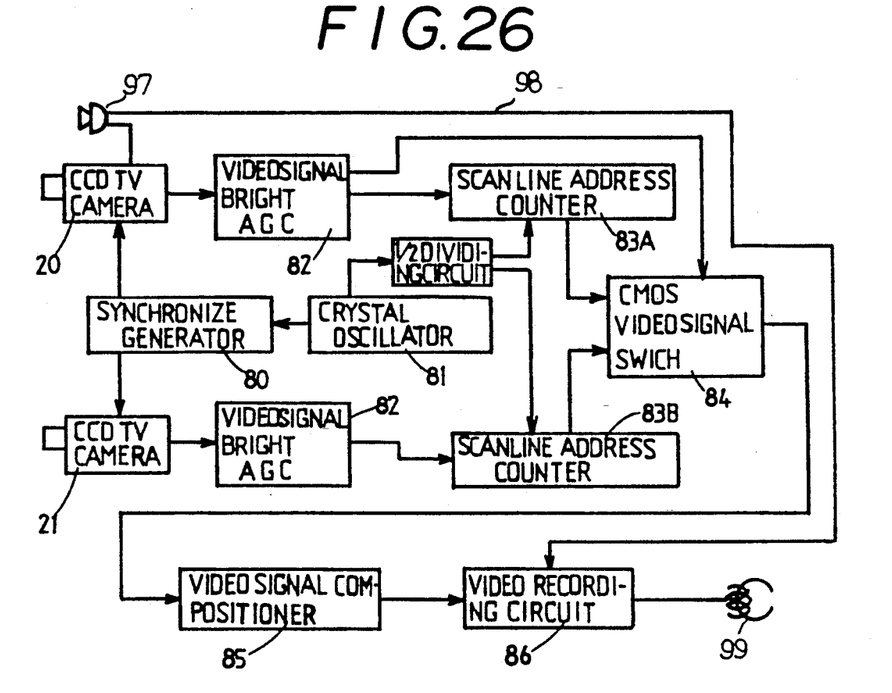
FIG. 26 shows a schematic block diagram of television camera and video recorder.

FIG. 26 is a block diagram for implementing the recording of video images captured by the two CCD cameras on magnetic tape. The first TV camera in the diagram corresponds to the first television camera 20 which has a built-in microphone. The second TV camera in the diagram corresponds the second television camera 21 which is installed on the upper leading edge of the vertical stabilizer 4.

The video signal of the monitor image captured by each camera is transmitted via a brightness AGC circuit 82 to a scanning address counter 83A or 83B which are independent of each other. They count the number of scan lines involved in the area a-b-d-c and the area c-d-f-e of the complex monitor image shown in FIG. 5. After a synchronous idle from a common crystal oscillator 81 is added, the scan address counter 83B outputs the top scan line a-b to the complex video signal compositioner 85 via a CMOS video signal switch 84. When number of the scan line count reaches a set value for the bottom scan line c-d, a switching signal is outputted from the counter 83B to the CMOS signal switch 84. Then the signal output from 83A takes over that of 83B. The counter 83A continues to count until the number of the scan lines reaches a set value for scan line e-f, then the counting switches back to counter 83B. By repeating switch over of the scan line output between signals from the two TV cameras, the two different video images can be synchronized and combined as one complex video image to be recorded on magnetic tape. In the diagram, the reference numeral 97 denotes a microphone, the reference numeral 98 denotes a audio signal path, and the reference numeral 99 denotes a magnetic video head.

Although not illustrated, configuration of the flight information recording device of this invention can be accomplished without installing the central display unit 30 on the instrument panel 9 if the circuit configuration is such that the items normally displayed on the central display unit are combined as signals and included in the complex image to be recorded.

Figure 27:
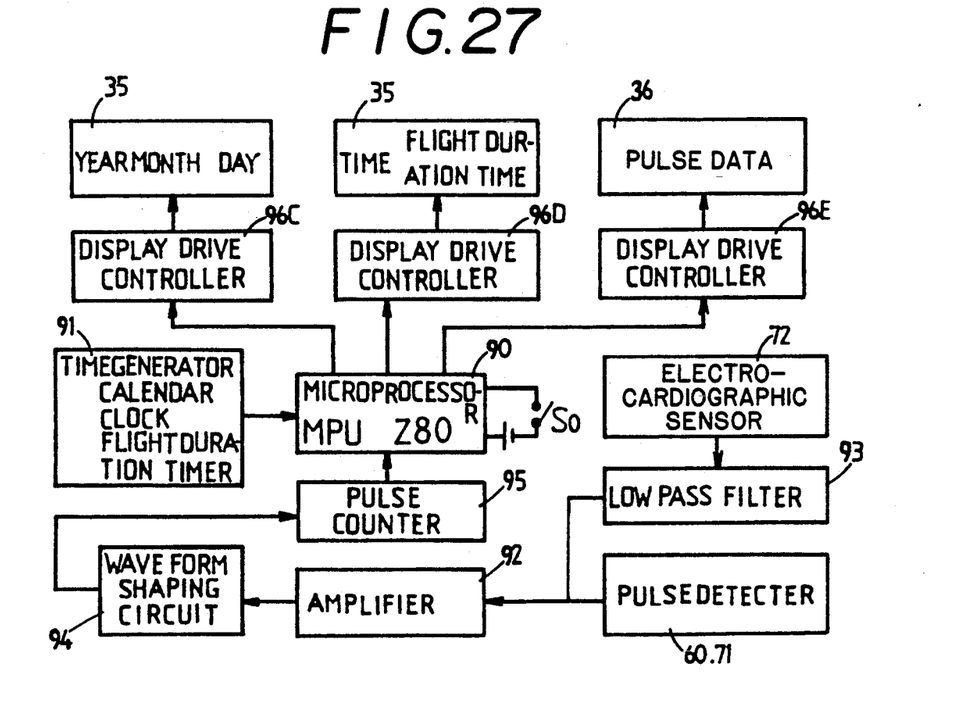
FIG. 27 shows a schematic block diagram of the central display unit.

FIG. 27 shows a block diagram of the central display unit 30 comprised of the timer generator 91 and its luminescent display array 35, the pulse detector 60,71, the electrocardiographic sensor 72 and its luminescent array 36 and the microprocessor 90.

Either the on-off light signal input form the pulse detector 60, 71, or a high-low voltage signal detected by electrocardiographic sensor 72, is filtered by a low pass filter 93 and amplified by an amplifier 92. This signal is shaped into a rectangular pulse by a waveform shaping circuit 94, converted into a pulse per minute signal by a counter 95 and inputted into the microprocessor 90.

At the same time, digital signals of the specifics of a particular calendar year, month, day, time, and flight duration data preprogrammed in the solid memory timer generator 91 are inputted into the microprocessor 90, which, in turn, supplies a continuous output of date and intermittent output of time of occurrence of an event or a flight duration to the display drive controller 96 C,D, and E. The ON-OFF switch (So) for microprocessor 90 sends the measurement start signal, which is inputted from the master switch via a relay to start the measurement of flight duration.

Figure 28:
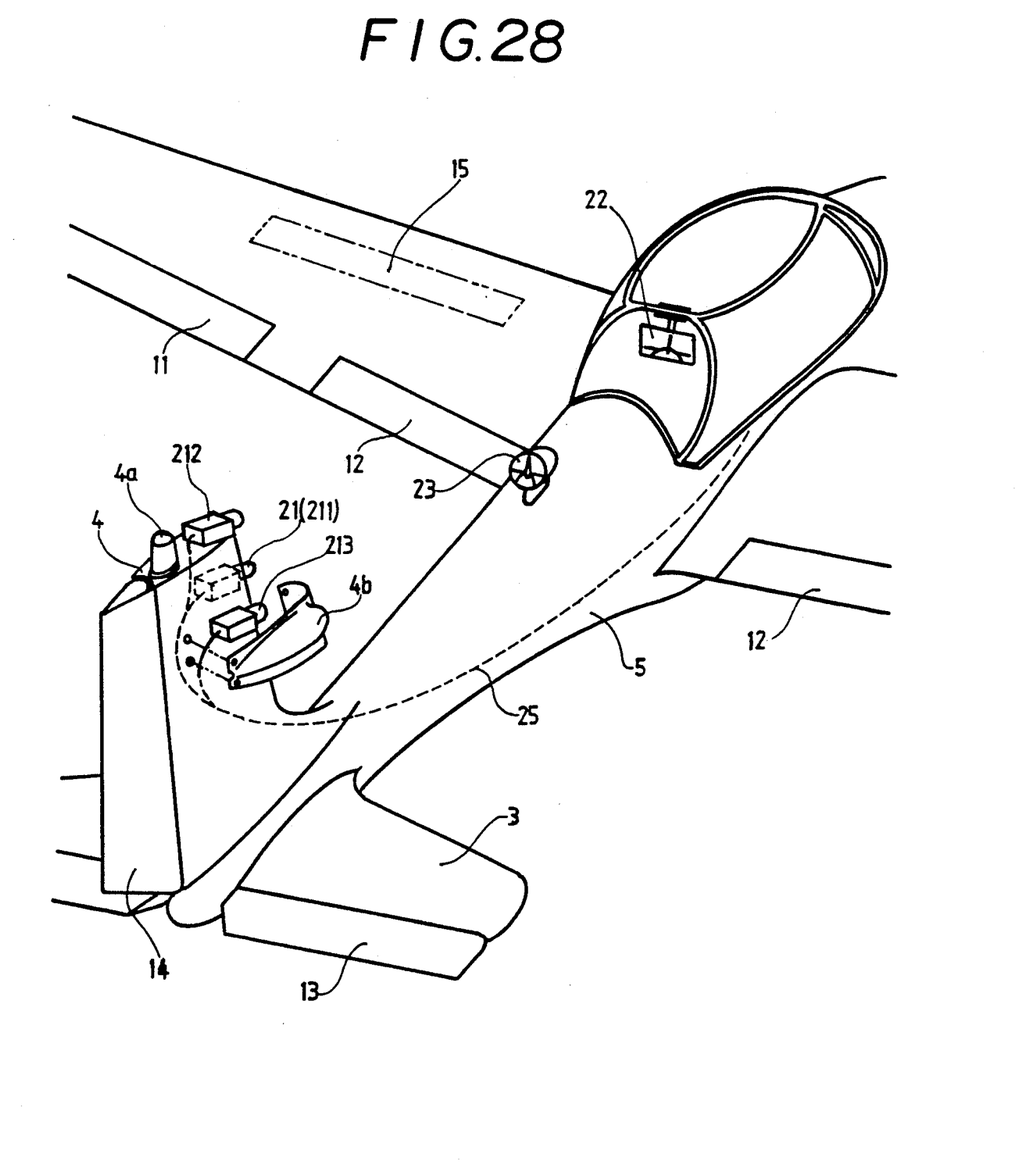
FIG. 28 is a perspective view of the television camera installed on the vertical stabilizer.

FIG. 28 shows various installation examples of the second television camera 21 on the vertical stabilizer 4. In the drawing, reference numeral 211 shows the TV camera 21 secured to the inside of the upper leading edge of the vertical stabilizer with its lens exposed. Reference numeral 212 denotes the camera 21 mounted on the extended base of the tail position light or rotating beacon 4a. Reference numeral 213 denotes the camera 21 being encased in a fairing 4b. Depending on the type of aircraft, the camera 21 may be installed and fixed in any desirable manner. Although not shown, the device and its function may also be applied to helicopters.

The above description provides the following advantages of the present invention which are:

(1) The displacement of each control surface moved by the pilot can be displayed and visualized on the central display unit together with data such as the calendar year, month, day, time and flight duration as well as the pilot's pulse and changes while encountering various flight conditions. A view of the instrument panel is captured by the television camera, which is installed in the rear of the cockpit. It records all information concerning the readings from the various gauges and instruments which change from time to time. It also records the displacement of the control system manipulated by the pilot, and the state of the pilot's pulse during flight. A change in the pulse rate of the pilot's heart indicates whether the pilot is calm or under stress. A decrease in the pulse count may result from an abnormal pulse or danger to the heart. This abnormality in pulse count is displayed by the luminescent array. Replaying and observing recorded magnetic tapes after flight helps to maintain and improve the health management of the pilot and to evaluate whether medical consultation is required. The use of these magnetic tapes help to explain the effectiveness of this invention in maintaining aviation safety in preventing an unfortunate aviation accident.

(2) While the complex mirror image is being recorded, since the built-in microphone of the first television camera installed behind the pilot's seat picks up ambient sounds including the conversation between the pilot and crew, the pilot's record concerning the position, altitude, speed of the aircraft, flight information, weather report, and other information received from the ATC communication, wind noise and engine sound during flight are also recorded. This device also serves as a voice recorder and capable of recording sound information which indicates whether the engine operation is normal or abnormal by examining an increase or decrease in wind noise, engine sound, or acceleration, deceleration or the stalling sound of the aircraft.

(3) The second television camera mounted on the vertical stabilizer is capable of capturing a view showing the banking angle or the relative attitude between the right/left main wing surfaces and the horizon, or ground surface, as a second piece of image information. Thus, the attitude of flight which changes every moment can be recorded. By the same token, an image of the actual displacement of the right/left ailerons, flaps or spoilers (if equipped), and the reflected image of the actual displacement of the rudder, elevator including a state of the vertical and horizontal stabilizers on the mirrors facing tail are recorded. This second piece of image information can be compared with the displacement indication of the luminescent display arrays on the central display unit, the image of which is included in the first piece of image information. During the flight of an aircraft on which proper maintenance is performed, the displacement of each control surface indicated on the central display unit and its actual displacement is supposed to be proportional to each other. In the event that they are different, the possibility of a deficiency occurring between the control linkage and control surface may be discovered when the magnetic tape is replayed and observed after flight. Furthermore, the occurrence of the stress-strain or wrinkle which never occurs on the ground while aircraft is not in flight can also be recorded. Therefore replaying and observing the magnetic tape after flight is an effective method for discovering structural failure and/or the fatigue at an early stage. Expediting repair or maintenance based on this information will contribute to the prevention of aircraft accidents.

(4) For aircraft that are equipped with this invention, when the complex image information and the voice recording are replayed, the invention enables the pilot to verify the flight conditions he/she has encountered and the action he/she has taken. It is therefore, useful to review and evaluate his/her flight log and to check if his/her judgment and/or decisions were proper. The tape can be used by instructors and trainees as an effective and visual teaching aid to upgrade their skills during flight instruction. The pre-and-post-briefing of flight can be conducted by verifying the image information. Proper instruction can be given when teaching flight maneuvers or safe and correct recovery from an abnormal attitude can be reinforced in the class room after the flight. Thus the invention is very effective in making flight training much safer, especially for unskilled trainees.

(5) In the event of an accident, the magnetic tape is recovered from the site of an accident. By observing the magnetic tape as it is replayed on a TV screen, the actual image of the flight until the moment the accident can be immediately observed. The display items of the central display unit and the indications of the various gauges and instruments as they change up to the moment of impact can be observed. This enables verification of the actual cause of an accident and reduces difficult analysis or guess work about the flight up to the moment of the accident. As a result, the analysis of an accident may be accomplished in a relatively short period of time so that effective and proper countermeasures or instruction can be implemented to enhance flight safety and to prevent an accident of the same type from reoccurring. This invention can be supplied as a useful flight information recording device that can provide means or preventing recurrence of similar accidents which have been considered unavoidable in the past.

(6) Small aircraft equipped with this invention have a great deal of advantage. The TV camera mounted on the vertical stabilizer can capture and record a view of a midair collision or near miss at the moment it occurs. The direction of an approaching aircraft and their damage or the maneuver of an aircraft avoiding near miss can be video taped, recorded, and stored. This gives an important clue for the near miss regarding the relative positions of the aircraft involved or provides vital analysis factors for determining the possible causes of accidents at the time of the post flight investigation. The device is superior to a conventional digital flight data recorder in that it can record the sight of a near miss or the moment of a collision in detail. This has been impossible by the conventional means. In addition, this invention is capable of recording the attitude of flight, flight data, the pilot's action, his/her pulse and voices on a single magnetic tape simultaneously. It does not require any special or exclusive instrument to replay and analyze the data. A home TV and a video recorder can serve the purpose of replaying the complex image information and voices.

(7) The actual state of the pilot is captured by the first television camera using the mirror on the instrument panel, it may offer useful information for analyzing the recorded data.

What is claimed is:

1. Flight information recording method using a flight information recording device comprising a central display unit 30, a first television camera 20, a second television camera 21, and a video recorder 24, said method comprising:

indicating displacements of connecting rods 55 between control devices 40, 41, 40a, 42 and control surfaces 10 manipulated by a pilot 8, and time data of the related information on said central display unit 30;

capturing a view of instrumental panel 9 including a displayed data on said central display unit 30 together with general pointer gauges and/or instruments by said first television camera 20 installed in a cockpit 6 as a first piece of image information 26;

capturing the actual state of a main wing 2 and that of a tail stabilizer 3, a vertical stabilizer 4, rudder 14 and elevations 13 which were reflected via mirrors 22, 23 installed on the middle of the upper fuselage to said second television camera 21 installed on a vertical stabilizer 4 facing the nose of the fuselage as a second piece of image information 27;

and synchronizing and combining said first and second image information as complex image information 28, and recording said complex image information on magnetic tape by said video recorder 24.

2. A method according to claim 1 wherein said second piece of image information 27 comprises image information of the horizon H in relation to said main wing 2 during level flight.

3. A method according to claim 1 wherein pulse data of the pilot 8 is detected by a pulse detector 60 installed on a grip of a control stick 40a or a control wheel 40.

4. A method according to claim 1 wherein pulse data of the pilot 8 is detected by a pulse detector 71 provided in an earlobe clip 73 on pilot's ear 8a, which clip is coupled to a headset 70 worn by the pilot 8.

5. A method according to claim 1 wherein pulse data of the pilot 8 is detected by an electrocardiographic sensor 72 which is pressed on pilot's ear 8a.

6. A method according to claim 1 wherein the actual state of the pilot 8 is captured by said television camera 20 using a mirror 29 provided on said instrument panel 9.

7. A flight information recording device comprising:
a central display unit 30 provided on an instrument panel 9 having display devices arranged to indicate flight information;
a first television camera 20 facing said central display unit 30;
mirrors 22, 23 provided inside a cockpit 6 and on top of the rear fuselage respectively facing a tail stabilizer 3;

a second television camera 21 provided on a vertical stabilizer 4 facing the nose of fuselage;

a video recorder 24 recording complex image information 28 synthesized from two images captured by said first and second television cameras on magnetic tape.

8. Flight information recording device according to claim 7 wherein a built-in microphone is provided in said first television camera 20 which records voices and sounds generated in the cockpit 6 such as conversation, ATC communications, and engine sounds.

9. Flight information recording device according to claim 7, said central display unit 30 comprising;

display devices 31, 32, 33, 34 indicating displacements of connecting rods which connect control devices such as a control wheel 40 or a control stick 40a, a rudder petal 41 and a flap lever 42 and the like to control surfaces 10;

a display device 36 indicating pulse data of the pilot 8 based on a normal pulse of the pilot shown at the lower part of the display as reference;

a display device 35 indicating information about the time that each event takes place.

10. Flight information recording device according to claim 9, wherein an arrangement of said display devices 31, 32, 33, 34 is molded after actual configuration of said control surfaces.

11. Flight information recording device according to claim 9 wherein a calendar time and a flight duration are indicated in the same window 35a of said display array, but alternatively and intermittently.

* * * * *